US007496771B2

(12) United States Patent
Knoth

(10) Patent No.: US 7,496,771 B2
(45) Date of Patent: Feb. 24, 2009

(54) PROCESSOR ACCESSING A SCRATCH PAD ON-DEMAND TO REDUCE POWER CONSUMPTION

(75) Inventor: Matthias Knoth, San Jose, CA (US)

(73) Assignee: MIPS Technologies, Inc., Mountain View, CA (US)

(*) Notice: Subject to any disclaimer, the term of this patent is extended or adjusted under 35 U.S.C. 154(b) by 410 days.

(21) Appl. No.: 11/272,737

(22) Filed: Nov. 15, 2005

(65) Prior Publication Data
US 2007/0113050 A1 May 17, 2007

(51) Int. Cl.
*G06F 1/00* (2006.01)
*G06F 1/32* (2006.01)
*G06F 9/40* (2006.01)

(52) U.S. Cl. .................. 713/300; 713/320; 712/205

(58) Field of Classification Search .......... 713/300, 713/320, 322, 323, 324
See application file for complete search history.

(56) References Cited

U.S. PATENT DOCUMENTS

| 5,091,851 | A |   | 2/1992  | Shelton et al.     |
| 5,325,511 | A |   | 6/1994  | Collins et al.     |
| 5,493,667 | A |   | 2/1996  | Huck et al.        |
| 5,734,881 | A |   | 3/1998  | White et al.       |
| 5,764,999 | A |   | 6/1998  | Wilcox et al.      |
| 5,809,326 | A | * | 9/1998  | Nogami ....... 712/32 |
| 5,848,433 | A |   | 12/1998 | Tran et al.        |
| 5,966,734 | A |   | 10/1999 | Mohamed et al.     |
| 6,044,478 | A |   | 3/2000  | Green              |
| 6,076,159 | A |   | 6/2000  | Fleck et al.       |
| 6,085,315 | A |   | 7/2000  | Fleck et al.       |
| 6,167,536 | A |   | 12/2000 | Mann               |
| 6,430,655 | B1|   | 8/2002  | Courtright et al.  |
| 6,477,639 | B1|   | 11/2002 | Krishnan et al.    |
| 6,505,285 | B1|   | 1/2003  | Rabinovici et al.  |
| 6,546,477 | B1|   | 4/2003  | Russo et al.       |

(Continued)

FOREIGN PATENT DOCUMENTS

GB     2304215 A     3/1997

(Continued)

OTHER PUBLICATIONS

International Search Report For International Application No. PCT/US2006/044354, filed Nov. 15, 2006.

(Continued)

*Primary Examiner*—Suresh K Suryawanshi
(74) *Attorney, Agent, or Firm*—Sterne, Kessler, Goldstein & Fox PLLC

(57) ABSTRACT

The present invention provides processing systems, apparatuses, and methods that access a scratch pad on-demand to reduce power consumption. In an embodiment, an instruction fetch unit initiates an instruction fetch. When a scratch pad is enabled, an instruction is retrieved from the scratch pad in parallel with a translation of a virtual address to a physical address. If the physical address is associated with the scratch pad, the retrieved instruction is provided to an execution unit. Otherwise, the scratch pad is disabled to reduce power consumption and the instruction fetch is re-initiated. When the scratch pad is disabled, an instruction is retrieved from another instruction source, such as an instruction cache, in parallel with the translation of the virtual address to the physical address. If the physical address is associated with the scratch pad, the scratch pad is enabled and the instruction fetch is re-initiated.

20 Claims, 3 Drawing Sheets

U.S. PATENT DOCUMENTS

| | | | |
|---|---|---|---|
| 6,557,127 | B1 | 4/2003 | Adams et al. |
| 6,757,817 | B1 | 6/2004 | Booth |
| 6,836,833 | B1 | 12/2004 | Kinter et al. |
| 2002/0087900 | A1* | 7/2002 | Homewood et al. ......... 713/320 |
| 2004/0024968 | A1* | 2/2004 | Lesartre et al. .............. 711/128 |
| 2004/0193858 | A1 | 9/2004 | Ahmad et al. |
| 2005/0044429 | A1* | 2/2005 | Gaskins et al. .............. 713/300 |
| 2005/0102483 | A1 | 5/2005 | Kinter et al. |
| 2005/0246499 | A1 | 11/2005 | Saida et al. |
| 2007/0113013 | A1 | 5/2007 | Knoth |
| 2007/0113057 | A1 | 5/2007 | Knoth |

OTHER PUBLICATIONS

Matthew C. Marten et al., "Modulo Schedule Buffers", IEEE, Dec. 2001, pp. 138-149.

Lea Hwang Lee, et al., "Instruction Fetch Energy Reduction Using Loop Caches for Embedded Applications with Small Tight Loops", ACM, Nov. 1998, pp. 267-269.

Intel Architecture Software Developer's Manual—vol. 2: Instruction Set Reference, Intel. Corporation, pp. 3-278 and 3-279 (1997).

Watts, C. et al., "ARM Intelligent Energy Manager Future Evolution," paper slide presentation distributed at the ARM Developers' Conference '04, 34 sheets (Oct. 2004).

Kandemir, M. et al. "Dynamic Management of Scratch-Pad Memory Space," *Proceedings of the 38th Design Automation Conference*, ACM, Las Vegas, Nevada, pp. 690-695 (Jun. 2001).

Panda, P. et al., "Data Memory Organization and Optimizations in Application-Specific Systems," *IEEE Design & Test of Computers*, IEEE, pp. 56-68 (May 2001).

Kandemir, M. et al., "Exploiting Shared Scratch Pad Memory Space in Embedded Multiprocessor Systems," *Proceedings of the 39th Design Automation Conference*, ACM, New Orleans, Louisiana, pp. 219-224 (Jun. 2002).

Kandemir, M. et al., "Exploiting Scratch Pad Memory Using Presburger Formulas," *Proceedings of ISSS '01*, ACM, Montreal, Quebec, Canada, pp. 7-12 (Oct. 2001).

Panda, P. et al., "Efficient Utilization of Scratch-Pad Memory in Embedded Processor Applications," *Proceedings of the European Design & Test Conference ED&TC 97*, IEEE, Paris France, pp. 7-11 (Mar. 1997).

Banakar, R. et al., "Scratchpad Memory: A Design Alternative for Cache On-chip memory in Embedded Systems," *Proceedings of CODES '02*, ACM, Estes Park, Colorado, pp. 73-78 (May 2002).

ADSP-21535 Blackfin™ DSP Brochure, Analog Devices, Inc., 4 pages (2001).

Nass, R., "Latest DSPs Poised to Drive 3G Revolution," *Portable Design* 8(9):26, 27, 28, 32, and 34, PennWell Corporation, Fair Lawn, New Jersey (Sep. 2001).

Intel® StrongARM® SA-1100 Microprocessor Developer's Manual, Intel. Corporation, pp. i-xix, 1-1 through 1-7, 2-1 through 2-8, and 6-1 through 6-7 (Aug. 1999).

Courtright, D., "Introducing: The MIPS32™ 4Kc™ and MIPS32™ 4Kp™ Processor Cores 'Jade'," paper slide presentation distributed at the Embedded Microprocessor Forum, pp. 1-25 (May 1999).

Krewell, Kevin, "Intel Looks To Core For Success", Microprocessor Report, vol. 20, Mar. 2006, pp. 1, 4, 5 and 6.

Bellas, N. et al., "Architectural and Compiler Techniques for Energy Reduction in High-Performance Microprocessors," *IEEE Trans. on Very Large Scale Integration (VLSI) Systems*, vol. 8, No. 3, pp. 317-326 (Jun. 2000).

Cotterell, S. and Vahid, F., "Tuning of Loop Cache Architecture to Programs in Embedded System Design," *ISSS'02*, 6 pages (Oct. 2002).

Fukuoka, K. et al., "Leakage Power Reduction for Clock Gating Scheme on PD-SOI," *IEEE Computer Society Int'l Symp. on Circuits and Systems*, pp. 613-616 (2004).

Pierce, J. and Mudge, T., "Wrong-Path Instruction Prefetching," *IEEE Computer Society 29th Int'l. Symp. on Microarchitecture*, pp. 165-175 (1996).

Solomon, B. et al., "Micro-Operation Cache: A Power Aware Frontend for Variable Instruction Length ISA," *Symp. on Low Power Electronics and Design*, pp. 4-9 (Aug. 2001).

* cited by examiner

PROCESSOR ACCESSING A SCRATCH PAD ON-DEMAND TO REDUCE POWER CONSUMPTION

CROSS REFERENCE TO RELATED APPLICATIONS

This application is related to commonly owned, co-pending U.S. application Ser. No. 11/272,718, filed on the same date herewith, entitled "Processor Utilizing A Loop Buffer To Reduce Power Consumption," and commonly owned, co-pending U.S. application Ser. No. 11/272,719, filed on the same date herewith, entitled "Microprocessor Having A Power-Saving Instruction Cache Way Predictor And Instruction Replacement Scheme," each of which is incorporated herein by reference in its entirety.

FIELD OF THE INVENTION

The present invention relates generally to microprocessors and reducing power consumption in microprocessors.

BACKGROUND OF THE INVENTION

An instruction fetch unit of a microprocessor is responsible for continually providing the next appropriate instruction to an execution unit of the microprocessor. Generally, an instruction fetch unit computes a virtual address for the next instruction to be fetched, translates the virtual address to a physical address, retrieves an instruction corresponding to the physical address, and provides the instruction to the execution unit.

When multiple instruction sources such as an instruction cache and scratch pad are available, the instruction fetch unit may not be able to determine which instruction source to use to retrieve the desired instruction until the virtual address is translated into a physical address. Rather than waiting for the virtual address to be translated, a conventional instruction fetch unit may access all of the instruction sources simultaneously while the address is translated. After the address translation is completed, a conventional instruction fetch unit will inspect the retrieved instructions to determine if the desired instruction was retrieved by one of the instruction sources. If none of the instruction sources has retrieved the desired instruction, a conventional instruction fetch unit uses the translated address to target the appropriate instruction source to retrieve the desired instruction.

Although, accessing all the instruction sources simultaneously may reduce the time required to retrieve an instruction, it unnecessarily consumes a significant amount of the total power of a microprocessor. This makes microprocessors having conventional fetch units undesirable and/or impractical for many applications.

What is needed is a microprocessor that can access a variety of instruction sources while consuming less power than a microprocessor having a conventional fetch unit.

BRIEF SUMMARY OF THE INVENTION

The present invention provides processing systems, apparatuses, and methods for accessing a scratch pad on-demand to reduce power consumption.

In one embodiment, an instruction fetch unit of a processor is configured to provide instructions from several instruction sources such as an instruction cache and a scratch pad to an execution unit of the processor. When the scratch pad is enabled, the scratch pad is accessed to retrieve an instruction based on the virtual address. In parallel with the scratch pad access, the MMU is accessed to translate the virtual address into a physical address. If the physical address is associated with the scratch pad, the instruction retrieved from the scratch pad is provided to the execution unit of the processor for execution. If the physical address is not associated with the scratch pad, the scratch pad is disabled to reduce power consumption and the instruction fetch unit re-initiates the instruction fetch so that the instruction can be retrieved from an instruction source other than the scratch pad.

In one embodiment, when the scratch pad is not enabled, another instruction source, such as the instruction cache, is accessed to retrieve an instruction based on the virtual address. In parallel with the instruction retrieval, the MMU is accessed to translate the virtual address into a physical address. If the physical address is associated with the scratch pad, the scratch pad is enabled and the instruction fetch unit re-initiates the instruction fetch so that the instruction can be retrieved from the scratch pad. In one embodiment, if the physical address is not associated with the scratch pad, the instruction retrieved from the other instruction source is provided to the execution unit of the processor for execution.

In one embodiment, another instruction source, such as the instruction cache, is disabled to reduce power consumption when the scratch pad is enabled and the instruction source is enabled when the scratch pad is disabled.

In one embodiment, components of a processor, such as the instruction cache and the scratch pad are disabled to reduce power consumption by controlling the clock signal that is delivered to the component. By maintaining the input clock signal at either a constant high or a constant low value, state registers in the component are suspended from latching new values and the logic blocks between the state registers are placed in a stable state. Once the components are placed in a stable state, the transistors in the state registers and the logic blocks are suspended from changing states and therefore do not consume power required to transition states.

In one embodiment, when a component is disabled to reduce power consumption, a bias voltage is applied to the component to further reduce power consumption resulting from leakage.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION OF THE INVENTION

The present invention provides processing systems, apparatuses, and methods for accessing a scratch pad on-demand to reduce power consumption.

In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
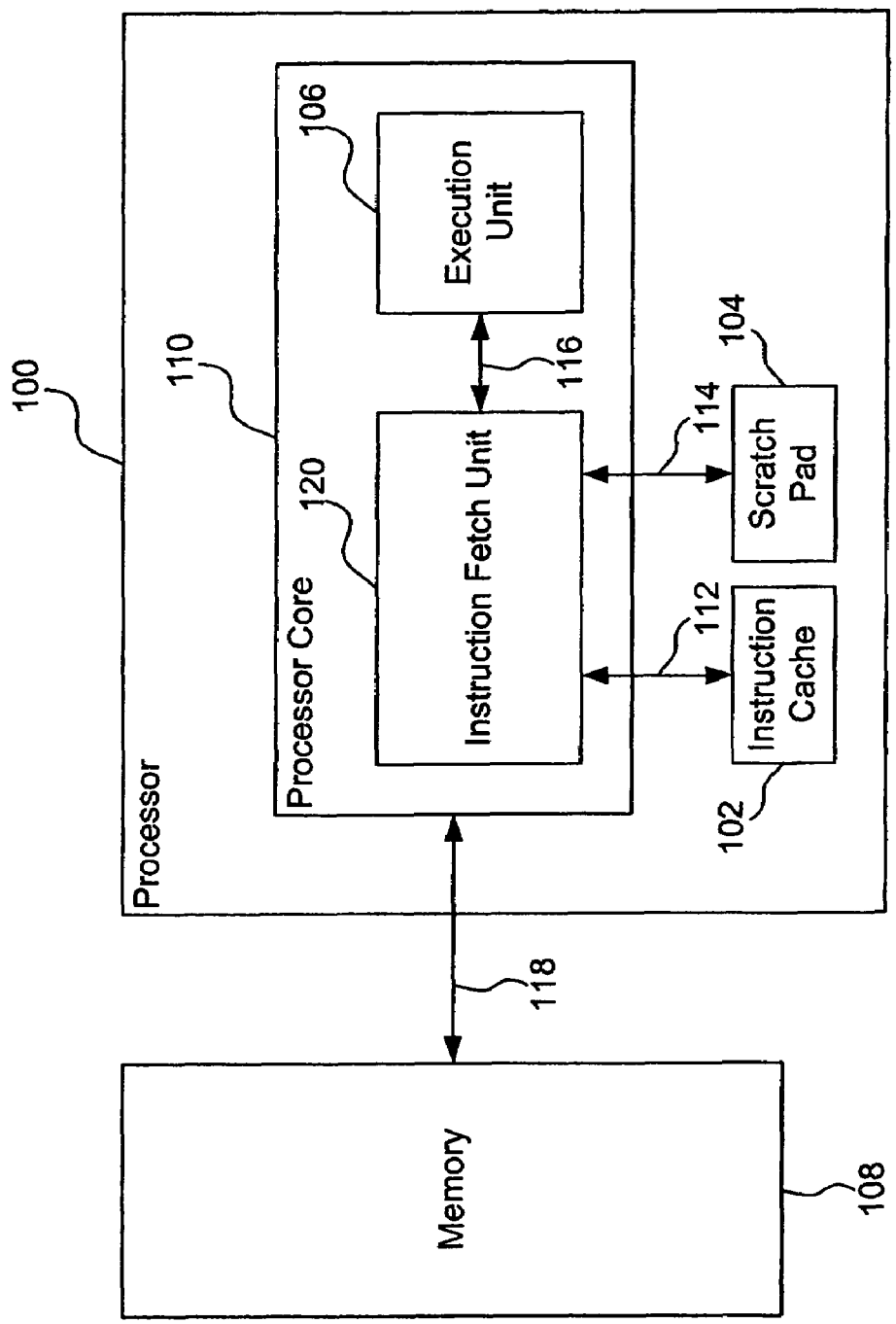
FIG. 1 is a diagram of a processor according to an embodiment of the present invention.

FIG. 1 is a diagram of a processor 100 according to an embodiment of the present invention. Processor 100 includes a processor core 110, an instruction cache 102, and a scratch pad 104. Processor core 110 includes an instruction fetch unit 120 and an execution unit 106. Processor 100 may access an external memory 108. Instructions retrieved from external memory 108 can be cached in instruction cache 102. Instruction fetch unit 120 interfaces with instruction cache 102, scratch pad 104, execution unit 106, and memory 108 through buses 112, 114, 116, and 118, respectively. As would be appreciated by those skilled in the relevant arts, instruction sources such as instruction cache 102 and scratch pad 104 may also be placed within processor core 110, within instruction fetch unit 120, or external to processor 100. Memory 108 may be, for example, a level two cache, a main memory, a read-only memory (ROM) or another storage device that is capable of storing instructions.

Figure 2:
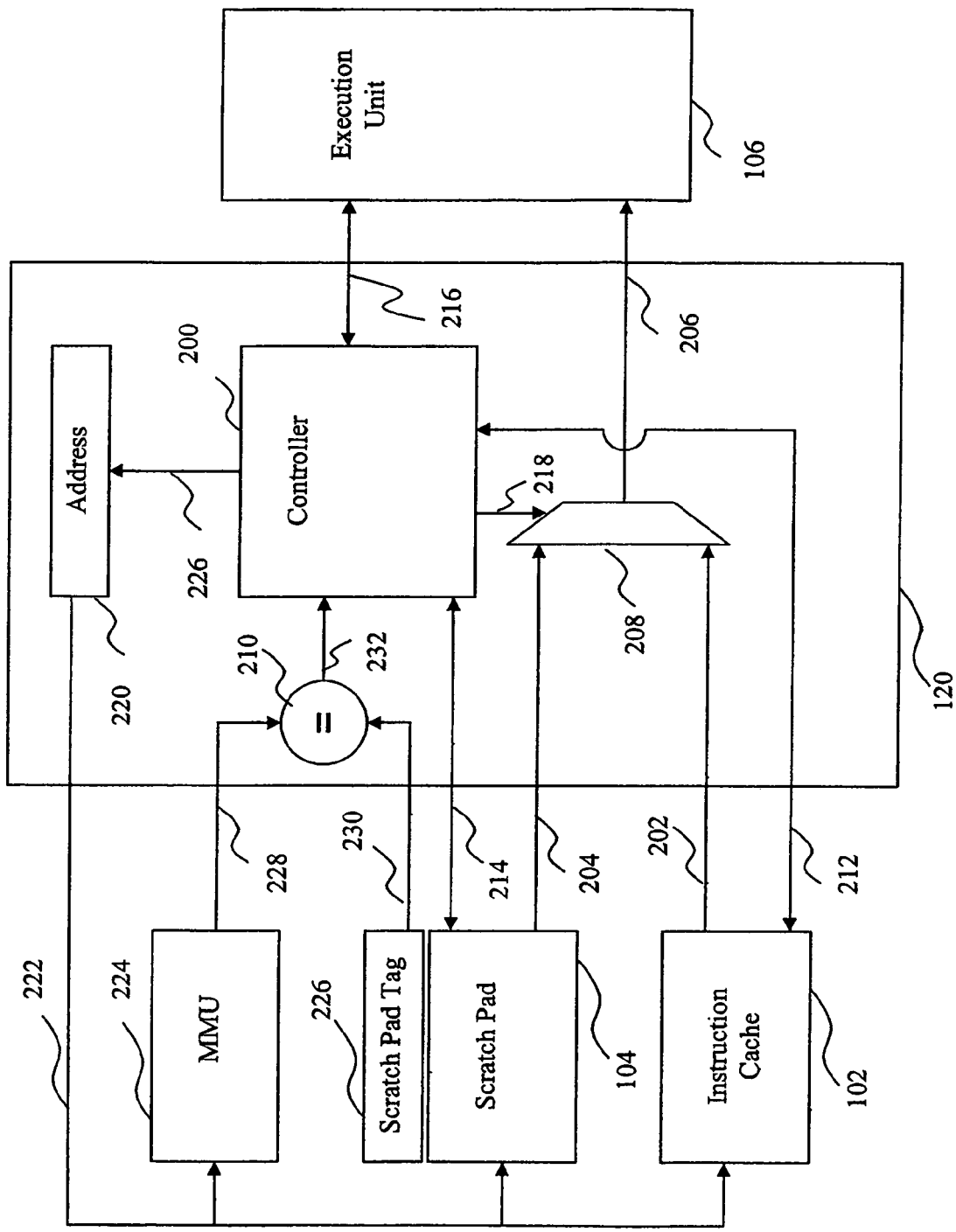
FIG. 2 is a more detailed diagram of the processor of FIG. 1.

FIG. 2 is a more detailed diagram of processor 100 according to one embodiment of the present invention. As shown in FIG. 2, instruction fetch unit 120 includes a fetch controller 200, a multiplexer 208, a comparator 210, and an address register 220. Fetch controller 200 interfaces with multiplexer 208, scratch pad 104, instruction cache 102, and execution unit 106 through buses 218, 214, 212, and 216, respectively. Buses 204, 214, and 222 represent components of bus 114. Buses 202, 212, and 222 represent components of bus 112. Buses 206 and 216 represent components of bus 116.

Register 220 stores a virtual address of an instruction to be fetched. Fetch controller 200 updates register 220 via bus 226 with the address of the instruction to be fetched. The virtual address stored in register 220 is made available to instruction cache 102, scratch pad 104, and a memory management unit (MMU) 224 through bus 222.

Memory management unit (MMU) 224 translates a virtual address provided from register 220 to a physical address. In one embodiment, MMU 224 is implemented, for example, using a translation lookaside buffer (TLB). MMU 224 may be placed within processor 100, within processor core 110, or within instruction fetch unit 120.

An address, such as the virtual address stored in register 220, includes a tag and an offset. The tag refers to a certain number of the most significant bits in an address. The offset refers to the remaining bits in the address. During address translation, only the bits in the tag of a virtual address are translated to generate a physical address. Hence, a virtual address and its corresponding physical address share the same bits for the offset. Since the bits in the offset of the physical address can be extracted from the virtual address prior to address translation, an instruction source such as scratch pad 104 and instruction cache 102 may be configured to guess and retrieve an instruction based solely on the offset of the virtual address.

When an instruction source is configured to retrieve an instruction based on the offset of the virtual address, the instruction source will provide an instruction as well as a tag of the physical address of the instruction. After the virtual address is translated, the tag of the instruction can be compared with the tag of the translated address to determine if the correct instruction was actually retrieved. If the guess was wrong, the instruction source can use the now known translated address to retrieve the correct instruction.

Scratch pad 104 is a memory preferably configured to provide instructions having a physical address with a tag specified in register 226. Hence, scratch pad 104 provides instructions for a single continuous range of physical addresses. The size of the range is the number of instructions that can be uniquely identified by the bits of the offset. Scratch pad 104 may be enabled and disabled. When disabled, scratch pad 104 reduces power consumption. When enabled, scratch pad 104 retrieves an instruction based on the offset of the virtual address stored in register 220 in parallel with the address translation performed by MMU 224. Once the translation is completed by MMU 224, the tag in register 226 can be compared with the tag of the translated address to determine if the instruction retrieved by scratch pad 104 corresponds to the virtual address stored in register 220. Scratch pad 104 provides a retrieved instruction on bus 204.

In one embodiment, scratch pad 104 may be configured to provide instructions from two or more continuous ranges of physical addresses. In such an embodiment, a separate tag register is provided to specify each range and the tags stored in each tag register are compared with the tag of the address translated by MMU 224 to determine if the virtual address stored in register 220 corresponds to one of the continuous ranges of physical addresses associated with scratch pad 104.

Register 226 may be implemented, for example, as part of scratch pad 104 or as part of instruction fetch unit 120. When register 226 is implemented as part of scratch pad 104, the tag stored in register 226 is made available to comparator 210 even when scratch pad 104 is disabled. In one embodiment, the tag in register 226 may be changed programmatically.

When enabled, instruction cache 102 provides instructions not provided by scratch pad 104. Instruction cache 102 may be enabled and disabled. When disabled, instruction cache 102 reduces power consumption. When enabled, instruction cache 102 retrieves an instruction using the offset of the virtual address stored in register 220. In addition, instruction cache 102 retrieves a tag of the physical address associated with the instruction. The retrieval of the instruction is performed in parallel with the address translation performed by MMU 224. After MMU 224 completes the translation, the instruction's tag is compared with the tag of the translated address to determine if the retrieved instruction corresponds to the virtual address stored in register 220. Instruction cache 102 provides a retrieved instruction on bus 202.

Instruction cache 102 may be implemented, for example, as a direct mapped or a set-associated cache. When the instruction cache is implemented as a set-associated cache, one or more bits in the offset of the virtual address stored in register 220 may be used as an index to select a set (or a way).

Comparator 210 determines whether the virtual address stored in register 220 corresponds to an instruction provided by scratch pad 104. The tag stored in register 226 is provided to comparator 210 on bus 230. After MMU 224 translates the virtual address stored in register 220, MMU 224 provides the tag of the translated address to comparator 210 on bus 228.

Comparator 210 compares the two tags to determine if they match. If they match, then the virtual address stored in register 220 corresponds to an instruction provided by scratch pad 104. The result of comparator 210 is provided to fetch controller 200 on bus 232. Based on the result of the comparison, fetch controller 200 causes multiplexer 208 to select between an instruction provided by scratch pad 104 on bus 204 and an instruction provided by instruction cache 102 on bus 202.

Because fetch controller 200 does not know whether the virtual address stored in register 220 corresponds with an instruction associated with scratch pad 104 or instruction cache 102 until after MMU 224 translates the virtual address, fetch controller 200 can access both scratch pad 104 and instruction cache 102 to retrieve instructions simultaneously. Once fetch controller 200 determines which instruction source should provide the instruction, fetch controller 200 can discard any incorrectly retrieved instructions. Although accessing scratch pad 104 and instruction cache 102 at the same time minimizes delay time, having both scratch pad 104 and instruction cache 102 enabled for every instruction fetch consumes a significant amount of the total power of processor 100.

Instructions of a program tend to exhibit spatial and temporal locality, thus scratch pad 104 and instruction cache 102 is each likely to be utilized to provide a sequence of instructions at a time. The present invention, as described herein, takes advantage of this observation in embodiments by enabling only one of scratch pad 104 or instruction cache 102 at any time. If scratch pad 104 is enabled to retrieve instructions and fetch controller 200 later determines, after the address translation by MMU 224, that the instruction should be retrieved from instruction cache 102, scratch pad 104 is disabled to reduce power consumption and the instruction fetch is re-started with instruction cache 102 enabled. Similarly, if instruction cache 102 is enabled to retrieve instructions and fetch controller 200 later determines during the course of the instruction fetch that the instruction should be provided by scratch pad 104, instruction cache 102 is disabled to reduce power consumption and the instruction fetch is re-started with scratch pad 104 enabled.

For programs that tend to retrieve instructions from scratch pad 104 and instruction cache 102 in bursts, enabling and disabling scratch pad 104 and instruction cache 102 will have minimal performance degradation since the amount of time spent to enable and disable scratch pad 104 and instruction cache 102 will be small compared to the amount of time spent providing instructions from scratch pad 104 and instruction cache 102. By disabling scratch pad 104 and instruction cache 102 in the manner described above, power savings are achieved.

Although the present invention attempts to disable scratch pad 104 when it is not providing instructions, scratch pad 104 is not disabled if it is performing another function. For example, if instructions are being stored into scratch pad 104, scratch pad 104 will not be disabled until after the instructions are stored in scratch pad 104. Likewise, if instruction cache 102 is performing another function, instruction cache 102 will not be disabled until it has completed the function.

Figure 3:
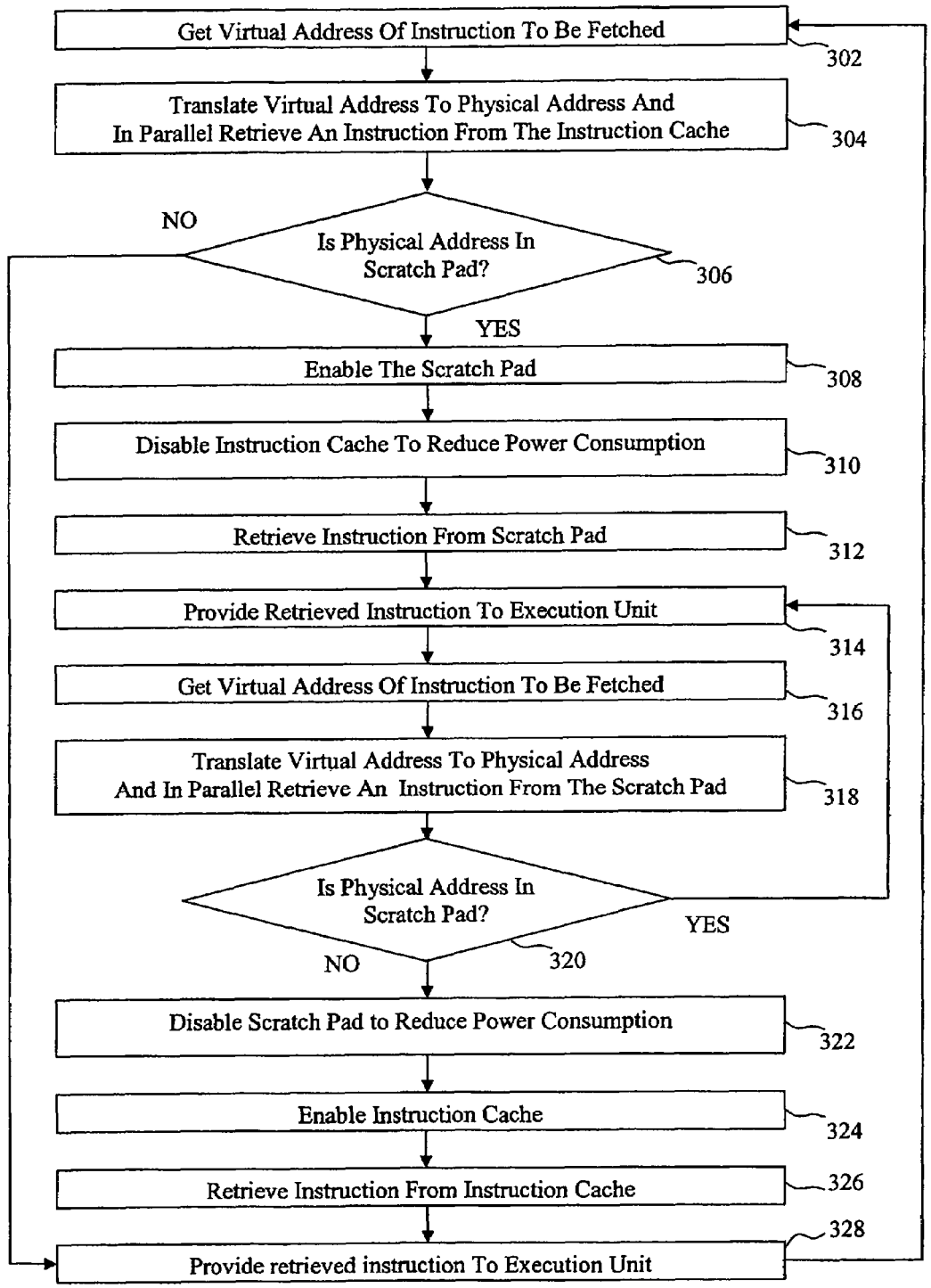
FIG. 3 is a flow chart illustrating the steps of a method embodiment of the present invention.

FIG. 3 depicts a flow chart illustrating the steps of a method 300 according to an embodiment of the present invention. Method 300 is used to retrieve instructions by a processor having access to a scratch pad and an instruction cache. While method 300 can be implemented, for example, using a processor according to the present invention, such as processor 100 illustrated in FIGS. 1-2, it is not limited to being implemented by processor 100. Method 300 begins with step 302.

In step 302, a virtual address of an instruction to be fetched and provided to an execution unit of a processor is determined. The virtual address may correspond, for example, to an instruction that can be provided by a scratch pad or an instruction cache of a processor. In one embodiment, an instruction fetch unit of the processor determines the virtual address of an instruction to be fetched by incrementing the virtual address of the previously fetched instruction or by using the target address of a jump or a branch instruction that was previously executed.

In step 304, the virtual address determined in step 302 is translated to generate a physical address. In parallel with the address translation, the instruction cache provides an instruction based on the virtual address. In one embodiment, a memory management unit performs the address translation.

In step 306, the physical address generated in step 304 is examined to determine if it is associated with an instruction that is provided by a scratch pad. For example, if the scratch pad provides instructions for a range of physical addresses associated with a single tag, the tag is compared with the tag of the physical address generated in step 304 to determine if they match. If the tags match, the physical address generated in step 304 is associated with the scratch pad.

If the physical address is associated with the scratch pad, method 300 proceeds to step 308. Otherwise, method 300 proceeds to step 328.

In step 308, the scratch pad is enabled unless it is already enabled. The scratch pad may already be enabled, for example, to store instructions into the scratch pad.

In step 310, the instruction cache is disabled to reduce power consumption. Control proceeds to step 312.

In step 312, the fetch for an instruction corresponding to the virtual address determined in step 302 is re-performed. Since the scratch pad was enabled in step 308, the scratch pad retrieves an instruction based on the virtual address determined in step 302.

In step 314, the instruction retrieved from the scratch pad is provided to an execution unit of the processor for execution. Control proceeds to step 316.

In step 316, a virtual address of an instruction to be fetched and provided to the execution unit of the processor is determined, as in step 302. Control proceeds to step 318.

In step 318, the virtual address determined in step 316 is translated to generate a physical address. In parallel with the address translation, the scratch pad retrieves an instruction based on the virtual address.

In step 320, the physical address generated in step 318 is examined to determine if it is associated with an instruction that is provided by the scratch pad. If the physical address is associated with the scratch pad, method 300 proceeds to step 314. Otherwise, method 300 proceeds to step 322.

In step 322, the scratch pad is disabled to reduce power consumption unless the scratch pad must remain enabled for another purpose. For example, if instructions are being stored in the scratch pad, the scratch pad will be disabled at a later time when instructions are no longer being stored in the scratch pad.

In step 324, the instruction cache is enabled. Control proceeds to step 326.

In step 326, the fetch for an instruction corresponding to the virtual address determined in step 316 is re-performed. Since the instruction cache was enabled in step 324, the instruction cache retrieves an instruction based on the virtual address determined in step 316.

In step 328, if the physical address of the instruction retrieved from the instruction cache corresponds to the virtual address of the instruction to be fetched, the instruction retrieved from the instruction cache is provided to the execution unit of the processor for execution. Otherwise, the instruction cache utilizes the physical address that was generated by translating the virtual address to retrieve and provide the correct instruction to the execution unit. The instruction cache, for example, may retrieve the correct instruction from an external memory. After step 328, method 300 proceeds to step 302.

As described herein, a component of a processor such as an instruction cache, a scratch pad, etc. may be disabled to reduce power consumption in accordance with the present invention by controlling the input clock signal of the component. By controlling the input clock signal so that the clock is maintained at a constant high or a constant low value, state registers in the component are suspended from latching new values. As a result, logic blocks between the state registers are kept in a stable state and the transistors in the logic blocks are suspended from changing states. Hence, when the input clock signal is controlled, the transistors in the state registers and logic blocks of the component are suspended from changing states and therefore no power is required to change states. Only the power required to maintain a stable state is consumed. In one embodiment, when a component is disabled to reduce power consumption, a bias voltage is applied to the component to further reduce power consumption arising from leakage.

While various embodiments of the present invention have been described above, it should be understood that they have been presented by way of example, and not limitation. It will be apparent to persons skilled in the relevant computer arts that various changes in form and detail can be made therein without departing from the spirit and scope of the invention. Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

For example, in addition to implementations using hardware (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC, SystemC Register Transfer Level (RTL), and so on, or other available programs, databases, and/or circuit (i.e., schematic) capture tools. Such software can be disposed in any known computer usable medium including semiconductor, magnetic disk, optical disk (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets.

It is understood that the apparatus and method embodiments described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalence.

What is claimed is:

1. A processor, comprising:
 a controller;
 an execution unit, coupled to the controller;
 an instruction cache, coupled to the controller;
 a scratch pad, coupled to the controller;
 a comparator coupled to the controller; and
 a memory management unit (MMU) coupled to the comparator,
 wherein the controller initiates an instruction fetch associated with a virtual address, the MMU translates the virtual address to a physical address, and the comparator determines whether the physical address is associated with the scratch pad, and
 when the scratch pad is enabled, the scratch pad is accessed to retrieve an instruction based on the virtual address in parallel with the MMU translation and if the physical address is associated with the scratch pad, the controller provides the instruction to the execution unit, otherwise, the controller disables the scratch pad to reduce power consumption and re-initiates the instruction fetch for the virtual address, and
 when the scratch pad is disabled, if the physical address is associated with the scratch pad, the controller enables the scratch pad and re-initiates the instruction fetch for the virtual address.

2. The processor of claim 1, wherein when the scratch pad is disabled, the instruction cache retrieves a second instruction based on the virtual address in parallel with the MMU translation, and if the physical address is not associated with the scratch pad, the controller provides the second instruction to the execution unit.

3. The processor of claim 1, wherein the controller disables the instruction cache, thereby reducing power consumption, if the scratch pad is enabled.

4. The processor of claim 1, wherein the controller disables the scratch pad by causing a clock signal value provided to the scratch pad to remain constant.

5. The processor of claim 4, wherein the controller adjusts a bias voltage applied to the scratch pad.

6. A method of performing an instruction fetch associated with a virtual address in a processor having a scratch pad and an instruction cache, comprising:
 (1) translating the virtual address to a physical address;
 (2) determining whether the physical address is associated with the scratch pad;
 (3) if the scratch pad is enabled,
  retrieving an instruction from the scratch pad, based on the virtual address, in parallel with step (1),
  if the physical address is associated with the scratch pad, providing the instruction to an execution unit, and
  if the physical address is not associated with the scratch pad, disabling the scratch pad, thereby reducing power consumption, and repeating steps (1)-(4); and
 (4) if the scratch pad is disabled and if the physical address is associated with the scratch pad, enabling the scratch pad, and repeating steps (1)-(4).

7. The method of claim 6, wherein step (4) further comprises:

retrieving a second instruction from the instruction cache, based on the virtual address, in parallel with step (1), if the physical address is not associated with the scratch pad, providing the second instruction to the execution unit.

8. The method of claim 6, wherein the instruction cache is disabled to reduce power consumption if the scratch pad is enabled, and the instruction cache is enabled if the scratch pad is disabled.

9. A tangible computer usable storage medium comprising a processor embodied in software, the processor comprising:
   a controller;
   an execution unit, coupled to the controller;
   an instruction cache, coupled to the controller;
   a scratch pad, coupled to the controller;
   a comparator coupled to the controller; and
   a memory management unit (MMU) coupled to the comparator,
   wherein the controller initiates an instruction fetch associated with a virtual address, the MMU translates the virtual address to a physical address, and the comparator determines whether the physical address is associated with the scratch pad, and
   when the scratch pad is enabled, the scratch pad is accessed to retrieve an instruction based on the virtual address in parallel with the MMU translation and if the physical address is associated with the scratch pad, the controller provides the instruction to the execution unit, otherwise, the controller disables the scratch pad to reduce power consumption and re-initiates the instruction fetch for the virtual address, and
   when the scratch pad is disabled, if the physical address is associated with the scratch pad, the controller enables the scratch pad and re-initiates the instruction fetch for the virtual address.

10. The tangible computer usable storage medium of claim 9, wherein when the scratch pad is disabled, the instruction cache retrieves a second instruction based on the virtual address in parallel with the MMU translation, and if the physical address is not associated with the scratch pad, the controller provides the second instruction to the execution unit.

11. The tangible computer usable storage medium of claim 9, wherein the controller disables the instruction cache, thereby reducing power consumption, if the scratch pad is enabled.

12. The tangible computer usable storage medium of claim 9, wherein the controller disables the scratch pad by causing a clock signal value provided to the scratch pad to remain constant.

13. The tangible computer usable storage medium of claim 9, wherein the controller adjusts a bias voltage applied to the scratch pad.

14. The tangible computer usable storage medium of claim 9, wherein the computer-readable program code is hardware description language code.

15. The tangible computer readable storage medium of claim 9, wherein the computer-readable program code is one of Verilog hardware description language code, VHDL hardware description language code, and SystemC hardware description language code.

16. A computer program product for use with a computing device, the computer program product comprising
   a tangible computer usable medium, having computer readable program code embodied thereon, for causing a processor, the computer readable program code comprising:
   first computer readable program code for providing a controller,
   second computer readable program code for providing an execution unit, coupled to the controller,
   third computer readable program code for providing an instruction cache, coupled to the controller,
   fourth computer readable program code for providing a scratch pad, coupled to the controller,
   fifth computer readable program code for providing a comparator coupled to the controller, and
   sixth computer readable program code for providing a memory management unit (MMU) coupled to the comparator,
   wherein the controller initiates an instruction fetch associated with a virtual address, the MMU translates the virtual address to a physical address, and the comparator determines whether the physical address is associated with the scratch pad, and
   when the scratch pad is enabled, the scratch pad retrieves an instruction based on the virtual address in parallel with the MMU translation and if the physical address is associated with the scratch pad, the controller provides the instruction to the execution unit, otherwise, the controller disables the scratch pad to reduce power consumption and re-initiates the instruction fetch for the virtual address, and
   when the scratch pad is disabled, if the physical address is associated with the scratch pad, the controller enables the scratch pad and re-initiates the instruction fetch for the virtual address.

17. The computer program product of claim 16, wherein when the scratch pad is not enabled, the instruction cache retrieves a second instruction based on the virtual address in parallel with the MMU translation, and if the physical address is not associated with the scratch pad, the controller provides the second instruction to the processor for execution.

18. The computer program product of claim 16, wherein the controller disables the instruction cache, thereby reducing power consumption, if the scratch pad is enabled.

19. The computer program product of claim 16, wherein the computer-readable program code is hardware description language code.

20. The computer program product of claim 16, wherein the computer-readable program code is one of Verilog hardware description language code, VHDL hardware description language code, and SystemC hardware description language code.

* * * * *

UNITED STATES PATENT AND TRADEMARK OFFICE
CERTIFICATE OF CORRECTION

PATENT NO. : 7,496,771 B2 Page 1 of 1
APPLICATION NO. : 11/272737
DATED : February 24, 2009
INVENTOR(S) : Matthias Knoth It is certified that error appears in the above-identified patent and that said Letters Patent is hereby corrected as shown below:

Claim 6, Column 8, Line 62, please replace "repeating steps (1)-(4)" with --repeating steps (1)-(3)--.

Signed and Sealed this

Twenty-second Day of December, 2009

David J. Kappos
*Director of the United States Patent and Trademark Office*